United States Patent [19]
Easterday

[11] 3,843,312
[45] Oct. 22, 1974

[54] PIGMENTED SEALING WAX CANDLE
[75] Inventor: David E. Easterday, Parkville, Mo.
[73] Assignee: Hallmark Cards, Inc., Kansas City, Mo.
[22] Filed: July 2, 1973
[21] Appl. No.: 375,361

[52] U.S. Cl. .................................. 431/288, 44/7.5
[51] Int. Cl. ............................................. F23d 3/16
[58] Field of Search ........................ 431/288; 44/7.5

[56] References Cited
UNITED STATES PATENTS
3,630,697  12/1971  Duling et al. .................. 431/288 X Primary Examiner—Carroll B. Dority, Jr.
Attorney, Agent, or Firm—Lowe, Kokjer, Kircher, Wharton & Bowman

[57] ABSTRACT

A formulation of natural wax, ethylene/vinyl acetate copolymer, extenders and pigment formed around a wick treated with glucose pentaacetate.

3 Claims, No Drawings

PIGMENTED SEALING WAX CANDLE

BACKGROUND OF THE INVENTION

Sealing waxes for the purpose of sealing documents of one form or another have been known since ancient times. Such waxes were ordinarily melted by flame from a source other than the wax itself. More recently, sealing wax candles having wicks by which the heat for melting the sealing wax is supplied have been known.

Traditionally, sealing waxes and sealing wax candles have been composed of rosins combined with shellac along with a suitable filler. However, sealing waxes of this composition have several drawbacks. They tend to drip excessively and the seal deposit tends to solidify into a relatively brittle state. Furthermore, the rosin or shellac base sealing waxes tend to carbonize (or blacken). In addition problems have been encountered in controlling flowability of melt, torching (ignition of droplets), smoking and inhibiting the penetration (strike through) of the wax into the body of the surface on which it is deposited.

One of the principal objects of the present invention is to provide a sealing wax whose functional and appearance properties are substantially better than what has been attainable in the past with traditional formulations. A related and equally important object is to provide a sealing wax candle embodying such a formulation which has greatly enhanced properties in relationship to known candles of this type. A further object is to provide a way for producing sealing wax candles with high pigment concentration which are capable of sustained burning and adequate burning speed without substantial burning of the candle body.

SUMMARY OF THE INVENTION

The present invention provides a sealing wax which has as one of its principal features the fact that rather than having a rosin or shellac base, the principal ingredient is a natural wax. The wax is combined with a vinyl resin, certain extenders and selected pigments and the formulation results in a sealing wax having many properties superior to those which are provided in currently available sealing waxes. Despite relatively high pigment concentration, the sealing wax is produced in the form of a candle having greatly superior functional properties as compared with presently known and commercially available items of this type.

DETAILED DESCRIPTION

The base formulation for the sealing wax of the instant invention is set forth in the following table:

| Ingredients | Range % (By Weight) |
|---|---|
| Candelilla Wax | 50.0–90.0 |
| Ethylene/Vinyl Acetate Copolymer | 9.0–20.0 |
| Silica Gel | 0.0– 1.0 |
| $SiO_2$ | 0.0–30.0 |
| $CaCo_3$ Pigment | 0.0–20.0 |
| Colored or Metallic Pigment | 0.0–20.0 |

The preferred copolymers for use in this invention are ethylene/vinyl acetate copolymers which contain from about 24 to 26 percent polymerized vinyl acetate. The preparation of ethylene/vinyl acetate copolymers is described in U.S. Pat. Nos. 2,490,550 and 2,492,760.

The preferred proportion of wax to copolymer by weight is approximately 5½ to 1.

The silica gel is a conventional commercially available grade. As a satisfactory example "Santocel 62" has been employed. "Santocel 62" is the trademark for a silica gel offered by Monsanto Chemical Company of St. Louis, Mo.

The silicon dioxide is also of conventional satisfactory commercial grade. A 240 mesh particle size is preferred. It is employed as an extender and filler. It is preferable to other fillers because it is translucent and does not interfere with the color system. It also lends solidity and heat retention properties and reduces shrinkage. The 240 mesh particle size is coarser than other of conventional fillers used, but is preferred because excessive fineness in the formulation of the invention interferes with the consistency of the melt.

Calcium carbonate of pigment grade is preferred in the instant formulation. It is basically employed as an extender or filler. With fluorescent pigments, the greater the amount of $CaCo_3$ used, the less fluorescent is the color appearance of the candle. For white colored candles, most of the calcium carbonate should be replaced with titanium dioxide.

Color pigments for the formulation are conventionally used pigments for candle making. From the standpoint of appearance, fluorescent pigments are preferred. Metallic pigments are also contemplated, these being such pigments as powdered bronze, powdered aluminum and the like.

Candle formulations are prepared by standard techniques, i.e., by melting and mixing the wax and ethylene/vinyl acetate copolymers and adding and mixing in the other components. The mixture is then formed in conventional fashion around the wick.

One of the critical and important parts of the invention relates to the treatment of the wick prior to its incorporation in the wax body. Both colored and metallic candles must be formed around a cotton wick which has been treated with one to four times its own weight of glucose pentaacetate. The glucose pentaacetate is first melted and the wick is treated by drawing the wick through it one or more times so as to incorporate glucose pentaacetate with the wick in the amount noted above. The wick itself can be any of the conventionally used configuration. It may be round or rectangular in cross-section. Preferably a braided cotton wick is employed.

As an example of a preferred colored sealing wax candle formulation the following is recommended:

Percentage (By Weight)

| | |
|---|---|
| Candelilla Wax | 54.50 |
| Ethylene/Vinyl Acetate Copolymer | 10.00 |
| Silica Gel | 0.50 |
| $SiO_2$ | 20.00 |
| $CaCO_3$ Pigment | 12.50 |
| Colored Pigment | 2.50 |
| | 100.00% |

For a metallic sealing wax candle the following formulation is recommended:

Percentage (By Weight)

| | |
|---|---|
| Candelilla Wax | 72.85 |
| Ethylene/Vinyl Acetate Copolymer | 13.35 |
| Metallic Pigment (powdered bronze, powdered aluminum) | 13.80 |
| | 100.00% |

As noted earlier both colored and metallic candles must be formed around a cotton wick treated with one to four times its own weight of glucose pentaacetate.

In the preferred examples, the ethylene/vinyl acetate copolymer is one offered and sold by E. I. Du Pont De Nemours and Company, Wilmington, Del. under its trade designation "Elvax 310." This copolymer has a vinyl acetate content by weight of approximately 25 percent and a melt index in g./10 min of 400. The hardness, based on a Shore A—2 durometer, 10 seconds, is 76, and the softening point, ring and ball, is 190° F.

As in the general formulation the silica gel is preferably "Santocel 62" and the silicon dioxide is 240 mesh.

Sealing wax candles based on the formulations herein taught have numerous advantages, many of which have heretofore been touched on. They have greatly improved shock resistance compared with known sealing waxes and there is reduced charring, smoking and torching during use. There is also an improved flow of melt from the candle and minimal strike through of the substance on which deposited.

The candles are capable of sustained burning with relatively high pigment concentration and they also have adequate burning speed with relatively high pigment concentrations. Apparently the pigments are barred from blocking the wick by the presence of the glucose pentaacetate which also has the ability of easy flammability, thus promoting burning.

From the foregoing, it will be seen that this invention is one well adapted to attain all the ends and objects hereinabove set forth, together with other advantages which are obvious and inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it will be understood that all matter herein set forth or shown in the accompanying drawing is to be interpreted as illustrative and not in a limiting sense.

Having thus described my invention, I claim:

1. A sealing wax candle comprising a formed body comprising a natural wax in the amount of from 50 to 90 percent by weight, an ethylene/vinyl acetate copolymer in the amount of 9 to 20 percent by weight, a pigment up to and including 20 percent by weight, and a wick embedded in said body, said wick comprising textile strands treated with glucose pentaacetate.

2. A sealing wax candle as in claim 1 in which said wax is candelilla wax.

3. A sealing wax candle as in claim 1 in which the proportion of wax to copolymer by weight is approximately 5½ to 1.

\* \* \* \* \*